324-366
10/20/81    XR    4,296,379

United States Patent [19]
Yoshizumi

[11] 4,296,379
[45] Oct. 20, 1981

[54] GROUND PROSPECTING METHOD UTILIZING ELECTRICAL RESISTIVITY MEASUREMENTS FOR MEASURING THE RESISTIVITY OF UNIT BLOCKS OF THE GROUND

[76] Inventor: Eizaburo Yoshizumi, 402 Manhegm Kamogawa, 14 Yoshida Kawara-machi, Sakyo-ku Kyoto-shi, Kyoto-fu, Japan

[21] Appl. No.: 936,057

[22] Filed: Aug. 23, 1978

[30] Foreign Application Priority Data

Aug. 25, 1977 [JP]  Japan ................................. 52-102040
Dec. 26, 1977 [JP]  Japan ................................. 52-156766
Dec. 27, 1977 [JP]  Japan ................................. 52-159646
Apr. 17, 1978 [JP]  Japan ................................. 53-44932

[51] Int. Cl.³ ............................................. G01V 3/02
[52] U.S. Cl. .................................... 324/357; 324/347; 324/366
[58] Field of Search ...................... 324/1, 9, 347, 357, 324/358, 360, 366

[56] References Cited
U.S. PATENT DOCUMENTS

| | | | |
|---|---|---|---|
| 1,906,271 | 5/1933 | Jakosky | 324/1 |
| 2,345,608 | 4/1944 | Lee | 324/1 |
| 2,390,270 | 12/1945 | Piety | 324/1 |
| 2,801,794 | 8/1957 | Garvin et al. | 324/1 X |
| 3,319,158 | 5/1967 | McDoulett et al. | 324/9 |
| 3,344,342 | 9/1967 | Kinghorn | 324/9 |
| 3,975,676 | 8/1976 | Bliamptis | 324/9 |

FOREIGN PATENT DOCUMENTS

758393  1/1934  France ................................. 324/357

*Primary Examiner*—Gerard R. Strecker
*Attorney, Agent, or Firm*—Ladas & Parry

[57] ABSTRACT

A method of electrically investigating the underground condition by measuring the apparent resistivity in the ground, in which the entire ground region to be investigated is assumed to be an aggregate of a plurality of unit blocks, and the resistivity of each of such unit blocks is analyzed from the measured apparent resistivity thereof to determine the underground condition.

7 Claims, 20 Drawing Figures

Fig. 5

| 11 | 12 | 13 |
|---|---|---|
| 1 1 1 | 1 1 1 | 1 1 1 |
| 1 1 1 | 1 1 1 | 1 1 1 |
| 1 1 1 | 1 1 1 | 1 1 1 |
| 1 1 1 | 1 1 1 | 1 1 1 |
| 1 1 1 | 1 1 1 | 1 1 1 |
| 1 1 1 | 1 1 1 | 1 1 1 |
| 1 1 1 | 1 1 1 | 1 1 1 |
| 1 1 1 | 1 1 1 | 1 1 1 |
| 1 1 1 | 1 1 1 | 1 1 1 |

Fig. 6

| 11 | 12 | 13 |
|---|---|---|
| 2 2 2 | 2 2 2 | 2 2 2 |
| 2 2 2 | 2 2 2 | 2 2 2 |
| 2 2 2 | 2 2 2 | 2 2 2 |
| 1 1 1 | 1 1 1 | 1 1 1 |
| 1 1 1 | 1 1 1 | 1 1 1 |
| 1 1 1 | 1 1 1 | 1 1 1 |
| 1 1 1 | 1 1 1 | 1 1 1 |
| 1 1 1 | 1 1 1 | 1 1 1 |
| 1 1 1 | 1 1 1 | 1 1 1 |

Fig. 7

| 11 | 12 | 13 |
|---|---|---|
| 3 3 3 | 3 3 3 | 3 3 3 |
| 3 3 3 | 3 3 3 | 3 3 3 |
| 3 3 3 | 3 3 3 | 3 3 3 |
| 2 2 2 | 2 2 2 | 2 2 2 |
| 2 2 2 | 2 2 2 | 2 2 2 |
| 2 2 2 | 2 2 2 | 2 2 2 |
| 1 1 1 | 1 1 1 | 1 1 1 |
| 1 1 1 | 1 1 1 | 1 1 1 |
| 1 1 1 | 1 1 1 | 1 1 1 |

Fig. 8

| 11 | 12 | 13 |
|---|---|---|
| 5 5 5 | 5 5 5 | 5 5 5 |
| 5 5 5 | 5 5 5 | 5 5 5 |
| 5 5 5 | 5 5 5 | 5 5 5 |
| 3 3 3 | 4 4 4 | 3 3 3 |
| 3 3 3 | 4 4 4 | 3 3 3 |
| 3 3 3 | 4 4 4 | 3 3 3 |
| 2 2 2 | 2 2 2 | 1 1 1 |
| 2 2 2 | 2 2 2 | 1 1 1 |
| 2 2 2 | 2 2 2 | 1 1 1 |

Fig. 9

| 11 | 12 | 13 |
|---|---|---|
| 5 5 5 | 5 5 5 | 5 5 5 |
| 5 5 5 | 5 5 5 | 5 5 5 |
| 5 5 5 | 5 5 5 | 5 5 5 |
| 4 4 4 | 5 5 5 | 5 5 5 |
| 4 4 4 | 5 5 5 | 5 5 5 |
| 4 4 4 | 5 5 5 | 5 5 5 |
| 3 3 3 | 3 3 3 | 2 2 2 |
| 3 3 3 | 3 3 3 | 2 2 2 |
| 3 3 3 | 3 3 3 | 2 2 2 |

Fig. 10

| 11 | 12 | 13 |
|---|---|---|
| 5 5 5 | 5 5 5 | 5 5 5 |
| 5 5 5 | 5 5 5 | 5 5 5 |
| 5 5 5 | 5 5 5 | 5 5 5 |
| 5 5 5 | 5 5 5 | 5 5 5 |
| 5 5 5 | 5 5 5 | 5 5 5 |
| 5 5 5 | 5 5 5 | 5 5 5 |
| 3 3 3 | 3 3 5 | 2 2 5 |
| 3 3 3 | 3 3 3 | 2 2 5 |
| 3 3 3 | 3 3 3 | 2 2 5 |

Fig. 11

| 11 | 12 | 13 |
|---|---|---|
| 5 5 5 | 5 5 5 | 5 5 5 |
| 5 5 5 | 5 5 5 | 5 5 5 |
| 5 5 5 | 5 5 5 | 5 5 5 |
| 5 5 5 | 5 5 5 | 5 5 5 |
| 5 5 5 | 5 5 5 | 5 5 5 |
| 5 5 5 | 5 5 5 | 5 5 5 |
| 4 4 4 | 5 5 5 | 5 5 5 |
| 4 4 4 | 5 5 5 | 5 5 5 |
| 4 4 4 | 5 5 5 | 5 5 5 |

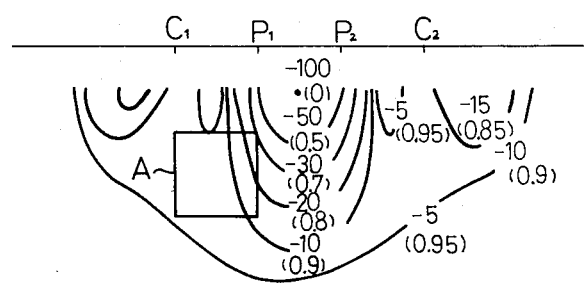

Fig. 15
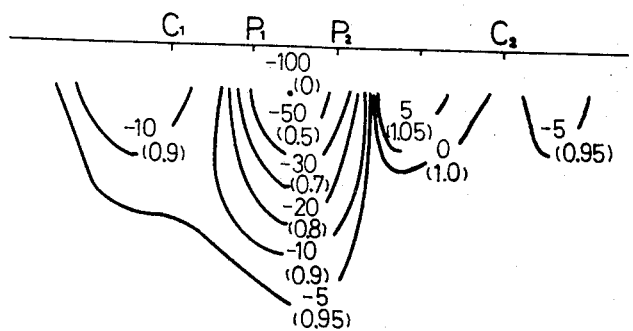
Fig. 16
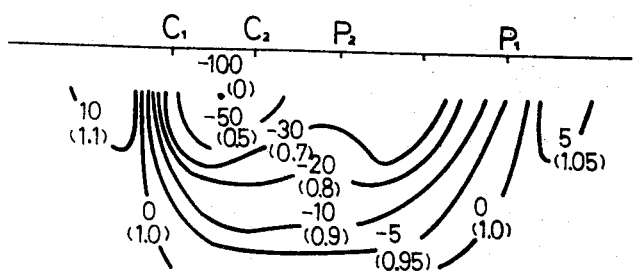
Fig. 17
Fig. 18
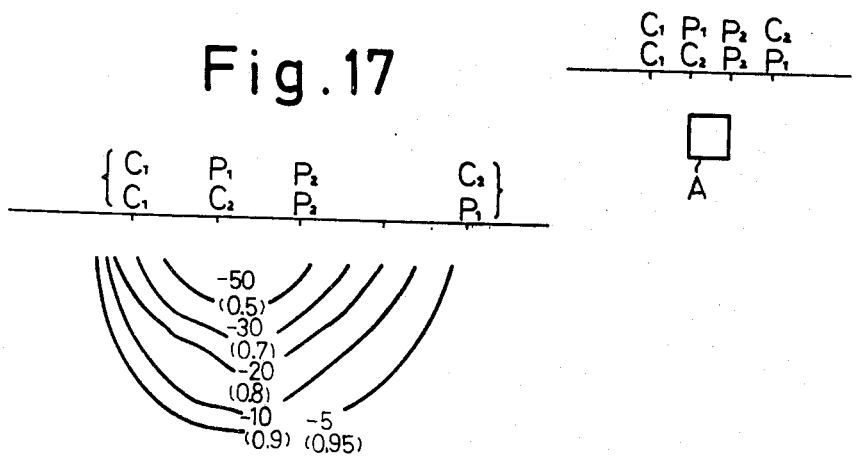

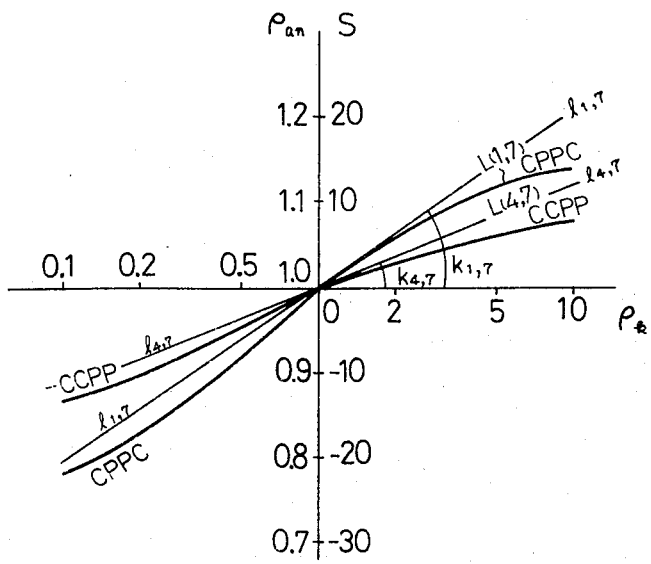

GROUND PROSPECTING METHOD UTILIZING ELECTRICAL RESISTIVITY MEASUREMENTS FOR MEASURING THE RESISTIVITY OF UNIT BLOCKS OF THE GROUND

BACKGROUND OF THE INVENTION

This invention relates to a resistivity electrical prospecting method in which the ground region to be probed is assumed to be an aggregate of a plurality of unit blocks and the resistivity of each of such unit blocks is analyzed from its apparent resistivity which is actually measured, thereby to determine the underground condition.

DESCRIPTION OF THE PRIOR ART

The method of determining the underground resistivity directly with no need of collecting samples was proposed by Frank Wenner as early as 1916. Studies for improving such method have been continued ever since, but so far, no drastic attainment has been achieved in the research techniques and little advancement has been made out of the pale of classical lines of study.

Here, the resistivity electrical prospecting system is briefly described. There are known the following two resistivity measuring methods: earthing resistance measuring method using two electrodes (FIG. 1(a)) and resistivity measuring method using four electrodes (FIG. 1(b)). The former is a local measuring system in which earthing resistance of each electrode is measured. This method, therefore, is strongly affected by resistivity of the underground structure near the electrodes. According to the latter method, influence of earthing resistance of the respective electrodes is eliminated by distinguishing two current electrodes $C_1$, $C_2$ from two potential electrodes $P_1$, $P_2$ as shown in FIG. 1(b) to allow measurement of resistivity of an extensive underground structure, but the resistivity measured according to this invention is merely a mean value of resistivity of the extensive underground structure, and it is uncertain what part of the underground structure is represented by the measurement. Therefore, one of the important problems to be solved in the resistivity electrical prospecting method is how to definitely relate the measured resistivity to the extensive underground structure.

In the resistivity measuring methods, the following Wenner's formula (1) is well known:

$$\rho = 2\pi a V/I \quad (1)$$

where a is the electrode spacing.

According to this formula (1), as far as the land resistivity is constant, there is always given a constant value no matter how great is the electrode spacing a. On the other hand, in case the land is not uniform and resistivity varies from place to place, or in case there exists in the ground an object(s) with particularly low or high resistivity, the measured resistivity can not necessarily be regarded as the real resistivity. It is also true that the measured resistivity does have a certain relation to the underground condition, and hence it is not always a mere average resistivity. Therefore, it is generally called "apparent resistivity".

As means for detecting the condition of penetration of injected liquid chemicals, there are generally employed the injected chemicals coloring method, isotope method, electrical resistance method, ground variation detection method and permeability coefficient detection method. However, such prospecting methods are merely methods for conceptionally knowing the condition of the wide-ranging ground area or are limited to local probing, so that it is considered hardly possible with such methods to correctly know the condition of the entire ground area to be investigated. Further, according to such methods, merely the ground condition after impregnation of a chemical solution is detected, and hence it is difficult to obtain a dynamic picture of the underground condition after chemical impregnation.

SUMMARY OF THE INVENTION

The first object of this invention is to provide a ground prospecting method in which the entire ground to be investigated is assumed to be an aggregate of a plurality of unit blocks with predetermined dimensions, and resistivity of each of such unit blocks is analyzed from the apparent resistivity thereof to know the condition of the entire ground region to be probed.

The second object of this invention is to provide a measuring technique for the said method in which first measuriang lines having electrodes are properly disposed in the ground while second measuring lines having electrodes are disposed to cross said first measuring lines at right angles, and the over overlapping area of a first zone with a certain set width, which crosses said first measuring lines at right angles, and a second zone with a set width, which crosses the second measuring lines at right angles, is regarded as one unit block, and the resistivity of each of such unit blocks is analyzed from a measured apparent resistivity thereof to thereby examine the condition of the entire ground to be probed.

The third object of the invention is to provide a method for resistivity electrical prospecting by disposing the measuring lines with electrodes either on the ground surface or underground, in which the entire ground to be investigated is divided into unit blocks each with a unit volume, and the change of resistivity in each such unit block with time is detected to know the change of condition of the entire ground region with time. For instance, change of condition with time after impregnation of liquid chemicals is determined to allow rational control of the chemicals impregnation operation.

The fourth object of the invention is to provide a grouting method in which each grouting pipe is inserted into a corresponding hole drilled in the ground to be investigated, and the resistivity measuring lines, each having plural electrodes, are disposed around said pipe or in its surrounding ground and grout is impregnated into the surrounding ground from said pipe by successively changing the grouting position. The surrounding ground is considered as an aggregate of unit blocks and the pattern of change of resistivity in each unit block in accordance with the grouting position and with time is analyzed to know the grouted condition into the surrounding ground to be investigated, thus allowing always accurate grouting operation.

The fifth object of the invention is to provide a ground exploration method in which current electrodes C and potential electrodes P are arranged at suitable intervals in the order of C-P-P-C and C-C-P-P in the ground to be explored and apparent resistivities thereof are determined, and the thus obtained apparent resistivities are integrated to thereby conceive the ground condition. More particularly, assuming that the apparent resistivity from electrode configuration C-P-P-C is $\rho_{a1}$ and that from electrode configuration C-C-P-P is $\rho_{a2}$, these apparent resistivities are synthesized by the following formula:

$$m\rho_{a1} + n\rho_{a2} \quad \text{(where m and n are coefficients)}$$

and accurate resistivity of each unit block is determined from the thus synthesized apparent resistivity to thereby know the ground condition.

The sixth object of the invention is to provide a method for facilitating determination of resistivity of each unit block, in which the entire ground to be investigated is assumed to be an aggregate of a plurality of unit blocks and there are used as many patterns of electrode configurations as the number of unit blocks, and as many sensitivity curves indicating the relation between change of resistivity of a unit block and change of apparent resistivity for each pattern of electrode configuration are prepared as the number of the unit blocks of said ground, and each sensitivity curve is approximated to a straight line to determine a coefficient from its inclination. Then resistivity of each unit block is obtained from said predetermined coefficient and the apparent resistivity value actually measured for each pattern of said electrode configuration, and the ground condition is judged from the thus determined resistivity of each unit block.

Other objects and advantages of this invention will become apparent as this description proceeds to describe the invention with reference to the accompanying drawings.

BRIEF DESCRIPTION OF THE DRAWINGS

FIGS. 5 to 11 illustrate views of the changes of grouting impregnation with time;

FIG. 12 illustrates a sensitivity distribution of $C_1P_1P_2C_2$ electrode arrangement;

FIG. 13 illustrates a sensitivity distribution of $C_1C_2P_2P_1$ electrode arrangement;

FIG. 14 illustrates a sensitivity distribution based on a synthesized sensitivity;

FIGS. 15 and 16 illustrate sensitivity distributions obtained from single electrode arrangements;

FIG. 17 illustrates sensitivity distribution obtained from a synthesized electrode arrangement;

FIG. 18 illustrates a relationship between two electrode, arrangements and a unit block;

FIG. 19 illustrates a sensitivity curve; and

FIG. 20 illustrates a relationship between 12 unit blocks and 12 patterns of electrode arrangement.

DESCRIPTION OF PREFERRED EMBODIMENTS

Figure 1:
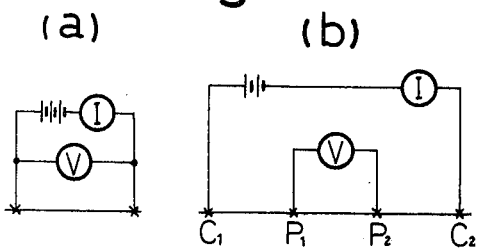
FIG. 1 is a wiring diagram of two resistivity measuring methods.
Figure 2:
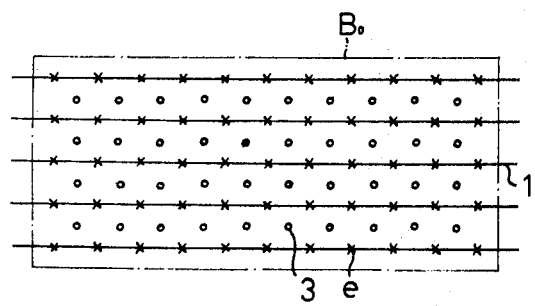
FIG. 2 is a plan view of detecting the ground condition by grouting impregnation.
Figure 3:
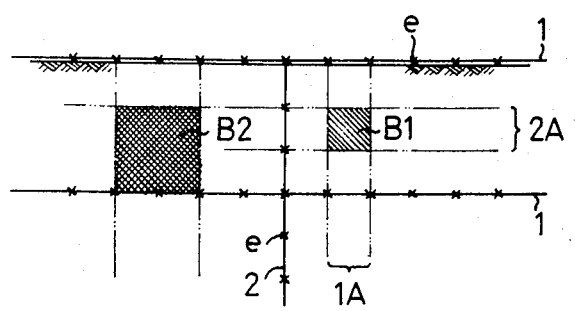
FIG. 3 is a sectional view of FIG. 2.

Referring to FIGS. 2 and 3, it will be seen that a plurality of horizontal measuring lines 1, each having a plurality of electrodes e, are disposed horizontally both on the ground surface and underground, while the vertical measuring lines 2, each being also provided with a plurality of electrodes e, are disposed vertically to said horizontal lines 1. Each said measuring line may be constituted, for example, from a cable wire provided with a plurality of electrodes at predetermined positions, and such measuring lines are stretched round crosswise on the ground surface, or when utilized for controlling the grouting work, they are inserted into the chemicals impregnation holes 3 together with the impregnation pipes, or inserted into the horizontally drilled measuring line burying pits.

Then, as shown in FIG. 3, the overlapping area B1 of certain vertical zone 1A defined by two adjoining electrodes on the horizontal lines 1 and a certain horizontal zone 2A defined by two adjoining electrodes on the vertical measuring lines 2 is set as one unit block. The entire ground zone BO to be investigated is assumed to be an aggregate of said unit blocks. Resistivity in each said unit block is analyzed, and the condition of chemical liquid impregnation in the entire ground zone BO is determined from the results of the analyses.

The size of each unit block may be optionally selected. For example, if such unit block is formed from an area defined by double electrode spacings as shown in FIG. 3, it is possible to obtain an overlapping area B2 which is four times as large as the area B1. Therefore, a section where minute probing is required may be divided into the smallest possible unit blocks B1 to obtain the resistivity data from all such small unit blocks, while a section of less importance may be divided into the wider unit blocks B2 to obtain data from such wide unit blocks. Each said unit block may be rectangular or may be a rectangular parallelepiped, that is, it may be either two-dimensional or three-dimensional. In the above-described example, the first measuring lines are arranged horizntally and the second measuring lines vertically, but they may be buried obliquely.

It is desirable for better measurement of sensitivity to provide a plurality of measuring lines to form many overlapping areas of the horizontal and vertical zones (first and and second zones) and analyze the resistivity of each such area as in the above-described embodiment, but it is also possible to set the unit blocks by providing a single measuring line for each direction and analyzing the resistivity of such unit blocks. In this case, although individual measurement precision is low, the measuring operation is simple and many measured values can be obtained.

Figure 4:
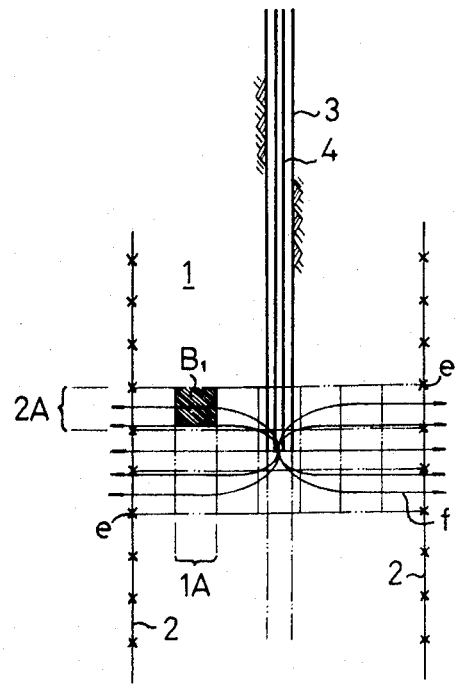
FIG. 4 is a sectional view exemplifying a method of detecting by grouting impregnation.

FIG. 4 exemplifies the method of detecting change of chemical impregnation with time. In the drawing, numeral 4 indicates a grouting pipe which is inserted into a chemical impregnation hole 3 for impregnating the grout f into the surrounding ground.

Generally, soft ground has a greater percentage of voids and is smaller in resistivity than the compact ground, and there is a tendency that resistivity is reduced when the ground is impregnated with a chemical solution. However, such tendency may fail to appear depending on the kind of the chemical solution used for impregnation, but it is certain that resistivity is changed by impregnation of a chemical solution.

It is therefore possible to know the condition of penetration of the chemical solution by detecting the change of resistivity with time in each of the set unit blocks B1 defined by the horizontal and vertical measuring lines 1 and 2 as described above. When the chemical solution has been duly injected into the ground at a certain level, the injection pipe 4 is raised up by one step and the chemical solution is again injected into the ground at this level while measuring apparent resistivity in the manner described above. The resistivities of unit blocks analyzed from these measurements allow rational control of the chemical impregnation work.

It is possible to accurately comprehend the ground condition from the measured apparent resistivities by use of the resistivity impregnation rate ($\alpha res$) of unit blocks expressed by the following formula (1) which I have originated:

$$\alpha res = \frac{\rho bw - \rho bg}{\rho bg} \div \frac{\rho w - \rho g}{\rho g} \qquad (1)$$

where
$\rho bw$: Unit block resistivity before chemical impregnation.
$\rho bg$: Unit block resistivity after impregnation.
$\rho w$: resistivity of underground water.
$\rho g$: resistivity of chemical solution.

This resistivity impregnation rate ($\alpha res$) may be divided into, for instance, the following five sections.

| Section | Resistivity impregnation rate |
|---------|-------------------------------|
| 1 | Less than 20% |
| 2 | 20-30% |
| 3 | 30-40% |
| 4 | 40-50% |
| 5 | More than 50% |

FIGS. 5 to 11 show the results of a test I have conducted by actually impregnating certain ground with a chemical solution and measuring the change of resistivity impregnation rate ($\alpha res$) with time. It is readily noted that the chemical solution is impregnated at successively higher rates as the figure number increases.

It is possible to analyze the unit block resistivities from the actually measured apparent resistivities by two methods according to the present invention. The first method is as follows. Generally, apparent resistivity $\rho a$ measured on the ground surface is given by the following formulas (2) where the electrodes are arranged equidistantly from each other in the order of C-P-P-C and C-C-P-P:

$$\rho a = 2\pi a V/I$$

$$\rho a = 6\pi a V/I \qquad (2)$$

where a: electrode spacing; V: potential; I: current. Where the electrodes are arranged in bore holes and, if the influence on the ground surface is ignored, the following formulas are given:

$$\rho a = 4\pi a V/I$$

$$\rho a = 12\pi a V/I \qquad (2')$$

Here, the rate of change of apparent resistivity according to the change of resistivity of a unit block in a certain electrode configuration is defined as "sensitivity", and it is supposed that such sensitivity is indicated in the center of the unit block. Also, the distribution of "sensitivity" resulting from movement of the unit blocks is defined as "sensitivity distribution". For instance, where the current electrodes C1, C2 and potential electrodes P1, P2 were arranged in the order of C1-P1-P2-C2 as shown in FIG. 12, if the apparent resistivity has changed from $\rho ac$ to $\rho ak$ in accordance with a change of resistivity of unit block A from homogenous resistivity $\rho c$ to $\rho k$, then $\rho ac = \rho c$, and the "sensitivity" S is given by the following formula (3) I have originated:

$$S = \frac{\rho ak - \rho c}{\rho c} \times 100 \ (\%) \qquad (3)$$

FIG. 12 shows the sensitivity distribution, with sensitivity being indicated in the center of unit block A. This figure shows the results in case k=0. From the formula (3), the relationship between resistivity of unit block A and apparent resistivity is given by the following formula (4):

$$\rho ak = \rho c \left( \frac{S}{100} + 1 \right) \qquad (4)$$

Thus the unit block resistivity-apparent resistivity distribution is completely the same as the sensitivity distribution and the former was shown in the parentheses below each sensitivity figure under the supposition that $\rho c = 1$.

FIG. 13 shows the sensitivity distribution in case the electrodes are arranged in the order of C1-C2-P2-P1.

It is, however, actually very difficult to properly conceive the ground condition from such sensitivity distributions because of their complexity.

I have attempted to determine the condition of the same ground by using the two different electrode arrangements C1-P1-P2-C2 and C1-C2-P2-P1 at the same time and have obtained good results.

Here, looking back to the results of FIGS. 12 and 13, it is noted that the sensitivity in a certain unit block A ($\rho k = 0$) is −6% in the case of FIG. 12 and −20% in the case case of FIG. 13. From the formula (3), apparent resistivity is 0.94 in the example of FIG. 12 and 0.80 in the example of FIG. 13. Thus, different apparent resistivities are given even though the position of the unit block A is same.

So, assuming the sensitivity in the case of FIG. 12 is S1 and that in the case of FIG. 13 is S2, they are synthesized by the following formula (5):

$$mS1 + nS2 \qquad (5) \qquad \text{(m and n are coefficients)}$$

and when sensitivity distribution is drawn up for each unit block according to this formula (5), there is given a distribution chart such as shown in FIG. 14 ($m = n = \frac{1}{2}$). When $\rho k = 0$, the negative region in the sensitivity distribution corresponds to the underground structure, while in the case of unit block resistivity-apparent resistivity distribution, the region smaller than 1 corresponds to the underground structure.

The distribution chart of FIG. 14 indicates a monotonous and directional sensitivity distribution which is convenient for actual field control, for example, for grasping the change of ground condition after chemical impregnation. Assuming that apparent resistivity in the case of the C1-P1-P2-C1 arrangement is $\rho a1$ and that in the case of the C1-C2-P2-P1 arrangement is $\rho a2$, if they are synthesized as:

from the results of measurements, the sensitivity distribution in this case is such as shown in FIG. 14, so that the results of my analyses hold to a good approximation with respect to the actual underground structure. It is thus possible with this method to perform an underground probing with close approximation to the actual ground to be investigated.

The coefficients m and n are used for determining the characteristics of the range to be detected in the sensitivity distribution of FIG. 14 in accordance with the object of probing of the underground structure, and after such determination, the results of measurements are treated according to the definition of $m\rho a1 + n\rho a2$ by using said values of m and n.

The electrode arrangements may not necessarily be on the ground surface alone; the electrodes may be similarly arranged in the ground, and the said arrangements may be used in many combinations. Also, the electrodes may not necessarily be arranged equidistantly from each other. FIGS. 15 and 16 show the distributions obtained from single electrode arrangements, and FIG. 17 shows the distribution obtained from a synthesized electrode arrangement.

The second method of analysis is one which uses a "sensitivity curve" based on the said sensitivity distribution chart.

The sensitivity distribution changes depending on the electrode spacing and the order of the arrangement of the electrodes (the term "electrode configuration" is used for denoting such spacing and order in this specification) and on resistivity $\rho k$ of unit block ($\rho k=0$ in the cases of FIGS. 12 and 13). The relationship between unit block resistivity $\rho k$ and apparent resistivity may be plotted in the coordinates, and this is defined by me as a "sensitivity curve". FIG. 19 shows an example. This indicates an example of change of sensitivity S and apparent resistivity $\rho ak$ according to change of resistivity $\rho k$ of unit block A (unit block No. 7 in FIG. 20) in the case of electrode arrangements C1-P1-P2-C2 and C1-C2-P2-P1 as shown in FIG. 18, and there are shown a sensitivity curve and a unit block resistivity-apparent resistivity curve as determined according to the analog and digital analyzers.

On the other hand, the ground region to be explored may be considered as an aggregate of 12 unit blocks as shown in FIG. 20, and there may be provided measuring lines involving 12 different patterns of electrode arrangements in correspondence to the number of unit blocks. Of course, the number and arrangement of the unit blocks and electrodes can be suitably selected according to the object or subject matter of investigation or other factors.

According to this arrangement, 12 sensitivity curves for 12 unit blocks can be obtained concerning one electrode arrangement for determining the change of apparent resistivity $\rho ak$ and sensitivity for each electrode arrangement according to change of resistivity $\rho k$ of each unit block. Since there are 12 different patterns of electrode arrangement, there can be obtained 144 (12×12) sensitivity curves in all. In FIG. 19, there are shown only two products of the sensitivity curve L (1, 7) concerning unit block No. 7 with relation to electrode arrangement pattern No. 1 and the sensitivity curve (4, 7) concerning unit block No. 7 with relation to electrode arrangement pattern No. 4.

These sensitivity curves L's (1, 7) and (4, 7) are approximated by the straight lines $1_{1,7}$ and $1_{4,7}$, and their inclinations are given as $k_{1,7}$ and $k_{4,7}$. The method of least squares or such may be employed as means for approximation. Approximation by means of broken lines, where the point of bent is given as origin, is also possible. In this way, 144 different coefficients can be obtained. Thus, if these coefficients are previously determined, apparent resistivity $\rho an$ according to electrode arrangement of arrangement pattern No. n can be calculated approximately from said coefficient and resistivity knq of the unit block of block No. q, in the form of the sum of the products of the coefficients and unit block resistivities as shown by the formula (7) below, and if resistivity of unit block is given, apparent resistivity can be also automatically obtained.

$$\rho a_1 = k_{1,1}\rho k_1 + k_{1,1}\rho k_2 + \ldots + k_{1,12}\rho k_{12}$$
$$\vdots$$
$$\rho an = k_{n,1}\rho k_1 + k_{n,2}\rho k_2 + \ldots + k_{n,12}\rho k_{12}$$
(7)

It is apparent resistivity ($\rho a_1, \rho a_2, \ldots \rho a$) alone that can be actually measured, but since 144 coefficients k's can be calculated beforehand, the resistivityes $\rho k_1, \rho k_2, \ldots \rho k_{12}$ of the respective unit blocks can be obtained from the formula (7). It is therefore possible to conceive the condition of the ground to be explored from the thus analyzed resistivities of the respective unit blocks.

Although the number of unit blocks may be suitably selected as said above, it is necessary to prepare as many patterns of electrode arrangements as the number of unit blocks used because otherwise it becomes impossible to solve the equations.

What is claimed is:

1. A ground prospecting method, comprising dividing the entire region of the ground to be probed into a plurality of unit blocks in two-dimensional, areal, form or three-dimensional, volumetric, form, measuring by means of a plurality of sets of spaced current and voltage electrodes the apparent resistivity of each said unit block, and analytically determining the true resistivity of each said unit block from said measured apparent resistivity thereof to ascertain the condition of said ground region.

2. A prospecting method according to claim 1, wherein first measuring lines, each having a plurality of electrodes, are disposed in the ground, while second measuring lines having a plurality of electrodes are disposed in the ground so as to cross said first measuring lines at right angles and to effect said dividing of the ground into said plurality of unit blocks, each unit block being defined by the overlapping of a first zone between four of said first measuring lines and a second zone between four of said second measuring lines.

3. A prospecting method according to claim 1, wherein a measuring line having a plurality of electrodes is disposed either on the ground surface or in the ground, a dynamic change of the resistivity of said entire region is caused, and the change of resistivity in each said unit block with time, analyzed from changes of apparent resistivities actually measured, is detected to thereby determine the change of condition of the entire ground region with time.

4. A prospecting method according to claim 1, wherein current electrodes C and potential electrodes P are arranged at suitable intervals in the ground to be probed in the order of C-P-P-C and C-C-P-P, apparent resistivities in the unit sections are measured with the aid of said electrodes, and the measured apparent resistivities are synthesized to thereby perceive the ground condition.

5. A method according to claim 4 wherein, assuming that apparent resistivity according to the electrode arrangement C-P-P-C is $\rho a1$ and that according to the electrode arrangement C-C-P-P is $\rho a2$, these apparent resistivities are synthesized by the following formula:

$$m\rho a1 + n\rho a2 \quad \text{(m and n are coefficients)}$$

and the ground condition is closely approximated (determined) from such synthesized apparent resistivities.

6. A prospecting method according to claim 1, wherein sensitivity curves indicating the relation between a change of unit block resistivity and a change of apparent resistivity for each of a plurality of patterns of electrodes are prepared, as many curves as the number of unit blocks of said ground, each of such sensitivity curves being approximated by a straight line to determine a coefficient from its inclination; resistivities of the respective unit blocks are calculated from apparent resistivities actually measured for the respective patterns of electrodes and said previously determined coefficients; and the ground condition is analyzed from the thus calculated resistivities of the respective unit blocks.

7. A prospecting method according to claim 1, wherein a plurality of grouting pipes is provided; each grouting pipe is inserted into a corresponding hole drilled in the ground to be probed; electrodes are arranged around said grouting pipe in the surrounding ground; grout is impregnated into the surrounding ground from said pipe by successively changing the impregnating level within said pipe; and the condition of grout impregnation into the surrounding ground is determined by detecting how the resistivity in each said unit block, analyzed from apparent resistivities which are actually measured, is changed in accordance with change of the grout impregnating level and impregnation time.

* * * * *